United States Patent [19]

Patte

[11] Patent Number: 5,042,996

[45] Date of Patent: Aug. 27, 1991

[54] PROCEDURE FOR THE DENATURATION OF PAINTS AND PRODUCTS FOR THIS PROCEDURE

[75] Inventor: Philippe Patte, Nancy, France

[73] Assignee: Air Industrie Systemes, Courbevoie, France

[21] Appl. No.: 632,863

[22] Filed: Dec. 24, 1990

[30] Foreign Application Priority Data

Dec. 26, 1989 [FR] France .................................. 89 17406

[51] Int. Cl.$^5$ .............................................. B01D 53/14
[52] U.S. Cl. .................................. 55/84; 55/DIG. 46; 98/115.2; 118/326; 427/444
[58] Field of Search ...................... 55/84, 89, 228, 229, 55/DIG. 46; 98/115.2; 118/326; 427/195, 444

[56] References Cited

U.S. PATENT DOCUMENTS

| | | | |
|---|---|---|---|
| 4,130,674 | 12/1978 | Roberts | 427/331 |
| 4,661,527 | 4/1987 | Seng | 521/55 |
| 4,735,637 | 4/1988 | Patte | 55/84 |

*Primary Examiner*—Charles Hart
*Attorney, Agent, or Firm*—Sughrue, Mion, Zinn, Macpeak & Seas

[57] ABSTRACT

Procedure for the denaturation of paints collected in painting booths and comprising a cleansing apparatus in which the air laden with paint droplets is placed in contact with a fluid to which is added a powder selected from phenolic or polyisocyanate powders.

Applications to the denaturation of paints in painting booth installations.

2 Claims, No Drawings

PROCEDURE FOR THE DENATURATION OF PAINTS AND PRODUCTS FOR THIS PROCEDURE

The present invention concerns a procedure for the denaturation of paints and products used in this procedure.

The present invention more specifically concerns the denaturation of paints collected in painting booths comprising a cleansing apparatus in which the air laden with paint droplets is placed in contact with a cleansing fluid to which an auxiliary powdered substance is added.

In equipment of this type, the paint is normally applied by spraying the objects to be painted as they are conveyed across said painting booths. This application method entails substantial losses of the paint, which is deposited, for example, on the walls and floors of the booths.

These deposits must be continuously removed if one wishes to avoid shutdowns of equipment operation required to clean said booths. For this purpose, the air of the cabins laden with paint droplets is suctioned across a cleansing apparatus containing a curtain of fluid; during this operation, the droplets are transferred from the air to this cleansing fluid, which is then drained into a collection tank where said fluid is separated out from the paint which it has collected, before being recycled in the cleansing apparatus.

The automobile industry will in the future use new types of paint to limit the release of organic solvents into the atmosphere. These paints include those containing high quantities of solvent-soluble substances, polyester paints, or dual-constituent paints. These paints prove very difficult to denature using conventional procedures such as those in which organic solvents or wetting or emulsifying agents are used.

Patent FR 2 607 141 discloses a procedure and an apparatus for the denaturation of paints of the kind described above, in which, in an air-cleansing device, the air laden with paint droplets is placed in contact with a washing fluid to which an expanded polyurethane powder has been added.

While this procedure yields satisfactory results, it creates a supply problem.

Indeed, it is essential, for reasons of transport cost, that a sufficient source of supply of expanded polyurethane powder be found in the immediate vicinity of an automobile plant. However, this requirement is not always met, thereby increasing considerably the cost of operation of an equipment installation according to the procedure described in FR 2 607 141.

The Applicant has thus set for itself the problem of offering a procedure for the denaturation of paints which, while retaining the advantages of expanded polyurethane powder, solves the supply problems it creates.

The characteristics and advantages of the procedure will emerge from the following description.

The procedure according to the invention is designed to be implemented in an installation such as that described in FR 2 607 141.

This installation (not shown) thus comprises a spray tunnel equipped with an air-cleansing apparatus for the collection of paint droplets and in which the air laden with paint droplets is placed in contact with a cleansing fluid composed of water, or possibly water to which an acid or base has been added. Cleansing fluid is fed to the cleansing apparatus by means of chutes installed on either side of said cleansing apparatus and channels for the recovery of the cleansing fluid direct this fluid to a collection tank from which the cleansing fluid is recycled to the feed chutes.

A conventional device such as that described, for example, in FR 2 607 141 feeds an additional substance, this substance being intended for mixing with the cleansing fluid in the area of the feed chutes supplying the cleansing apparatus, i.e., "upstream" from this latter.

In Patent FR 2 607 141, the added substance is expanded polyurethane powder.

Now, Applicant has discovered that expanded polyurethane could be advantageously replaced by a phenolic or polyisocyanate foam.

In fact, these two products denature paints, i.e., they cause mainly a loss of bonding force as pronounced as that observed when polyurethane powder is used.

Furthermore, all of the sediment obtained floats and can thus be easily recovered by scraping.

The fact that these two products yield satisfactory results was anything but obvious, since tests were also conducted using expanded polystyrene, which is one of the most widely-used polymer materials and which is a priori the most obvious choice to replace expanded polyurethane. Now, these tests showed that, when used in any quantity, expanded polystyrene had no denaturing force on these paints, since their bonding power remained intact.

Furthermore, it emerged that, while the method for obtaining polyurethane powder had no effect on the powder consumption during the procedure, this was no longer the case when using phenolic or polyisocyanate foams.

More especially, for a given paint composed of a mixture of varnishes, lacquers, and metallic paints, if panels are crushed to obtain the powder, the powder consumption expressed in kg of powder per kg of paint corresponds to the following figures as a function of the composition of the crushed panels:

| polyurethane panel | 0.12 |
| phenolic foam panel | 0.24 |
| polyisocyanate foam panel | 0.62. |

On the other hand, if the powders are obtained by sawing or shredding the panels, consumptions figures are as follows:

| polyurethane panel | 0.12 |
| phenolic foam panel | 0.18 |
| polyisocyanate foam panel | 0.30. |

It clearly emerges, therefore, that the method used to obtain the powder, while not affecting the capacity of the powder to denature the paint, on the other hand substantially affects consumption.

This may be explained by the fact that, in the case of the grinding procedure, phenolic or polyisocyanate foams do not give powders but very fine flakes which cannot be distributed homogeneously in the cleansing fluid.

This phenomenon may be observed quite simply by conducting a measurement of apparent density.

In fact, the density of a powder of crushed phenolic foam is approximately 20 g/dm3, while it is 50-80 g/dm3 if the powder is obtained by sawing.

Similarly, a powder of polyisocyanate foam obtained by crushing has a density of approximately 35 g/dm3 as opposed to 100-120 g/dm3 if obtained by sawing.

The use of powders made from phenolic or polyisocyanate foams thus constitutes a satisfactory alternative solution by creating an additional source of supply.

Furthermore, the use of powders made of these foams and obtained by sawing or shredding panels formed from said foams makes it possible to obtain a substantially increased yield from the procedure by reducing considerably the consumption of powder during the denaturation procedure.

I claim:

1. A process for the denaturation of paints collected in painting booths, comprising placing air laden with paint droplets in contact with a fluid including a powder made from a foam in a cleansing apparatus, wherein the powder is selected from the group consisting of phenolic powders and polyisocyanate powders.

2. The process of claim 1, wherein said powder is obtained by sawing or shredding panels formed from a phenolic foam or a polyisocyanate foam.

* * * * *